Sept. 28, 1965 P. L. KNIGHT ETAL 3,208,830
ATMOSPHERE GAS GENERATOR
Filed March 5, 1962
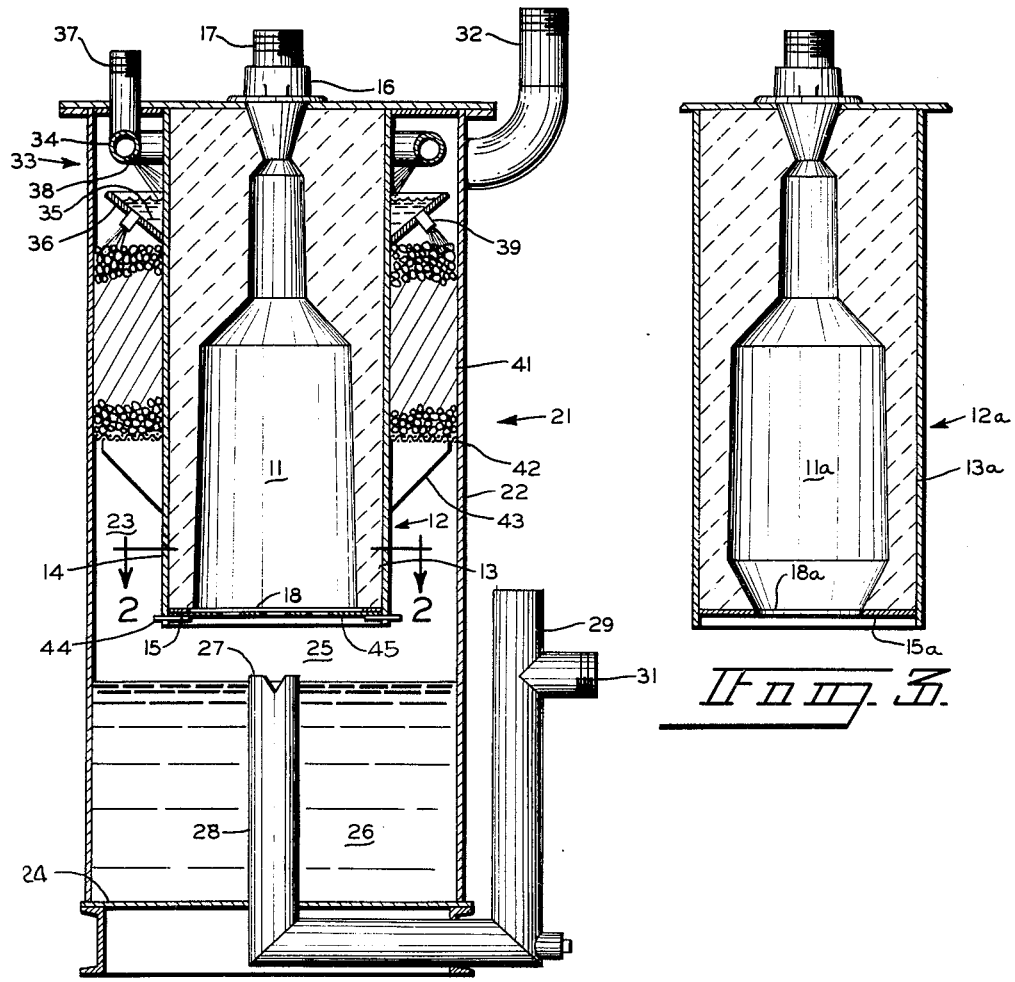
INVENTORS.
PHILIP L. KNIGHT
CHARLES W. SANZENBACHER
HAL R. CRANFORD
JOHN D. NESBITT
BY
Alfred L. Patmore, Jr.
ATTORNEY

United States Patent Office 3,208,830
Patented Sept. 28, 1965

3,208,830
ATMOSPHERE GAS GENERATOR
Philip L. Knight, Charles W. Sanzenbacher, Hal R. Cranford, and John D. Nesbitt, Toledo, Ohio, assignors to Midland-Ross Corporation, Toledo, Ohio, a corporation of Ohio
Filed Mar. 5, 1962, Ser. No. 177,651
3 Claims. (Cl. 23—281)

This invention relates to improvements in atmosphere gas generators of the type adapted to generate a gaseous atmosphere for use in various metallurgical, chemical and other processes. The invention relates particularly to gas generators of the exothermic type wherein the generation of the gaseous atmosphere includes the step of reacting fuel (usually a hydrocarbon such as methane) and an oxidant (air) in such proportions as to liberate heat, i.e. a combustion reaction. The invention is directed primarily toward improvements in the step of cooling the products of the aforesaid reaction (combustion products) which may attain temperatures of the order of magnitude of 3000° F. by virtue of the heat released during the combustion reaction.

The typical gas generator generates a gaseous atmosphere by the combustible reaction of methane ($CH_4$) and air ($O_2+N_2$). The products of this combustion reaction normally contain some or all of the following constituents depending on the relative quantities of air and methane which are reacted: $CO_2$, $CO$, $H_2$, and $N_2$. These constituents are involved in multitudinous reversible reactions with one another which are very complex. A number of unstable intermediate compounds such as NO, OH and O are formed as a result of these reversible reactions. Generally, the presence of these unstable intermediates is not desired in the product atmosphere. Because of their instability, however, these compounds tend to re-react as they are cooled to form more stable constituents unless the cooling rate is so rapid as to inhibit the re-reaction of the undesirable intermediate compounds.

Prior artisans have utilized three (3) general techniques for cooling the combustion products of an atmosphere gas generator. The first technique involves the use of an indirect heat exchanger. Use of this technique results in a desirably slow rate of cooling of the products. However, the requisite heat exchanger is subject to thermal deterioration by the initially high temperature of the combustion products with resulting high initial and maintenance costs.

The second cooling technique involves releasing the combustion products at a point below the level of cooling liquid in a sump and allowing the products to cool as they bubble upwardly through the liquid to the top thereof. The use of this cooling technique involves minimum expense, both initially and in maintenance, but results in an undesirably rapid rate of cooling of the combustion products by virture of their tendency to separate into many small individual bubbles, each of which cools almost instantaneously. Thus, the use of this technique involves maximum danger of obtaining undesirable intermediate compounds in the product atmosphere gas.

The third cooling technique involves passing the combustion products through a packed bed in direct contact with cooling fluid also passed therethrough. It is believed that the rate of cooling of the combustion products according to this technique is less rapid than the rate of cooling according to the submerged release technique and is sufficiently slow to inhibit the formation of intermediates to a suitably low value. Also, the pressure drop of the products being generated is lower when they are passed through a packed bed than when they are bubbled through a liquid. Consequently, the technique of cooling combustion products by direct contact with cooling fluid in a packed bed has attained considerable favor in the atmosphere gas generator art.

The specific apparatus used in prior art gas atmosphere generators for directly cooling combustion products by means of a packed bed is, however, very cumbersome. Conventionally, the cooling step is accomplished in a cooling tower separate from the combustion chamber, thereby requiring that very high temperature products be piped some distance. The pipe for accomplishing this must normally be water-jacketed, which adds to the expense of construction, and, despite the use of water-jacketing, is nonetheless subject to failure because of the high temperature of the combustion products. In addition, it was frequently found necessary to water-jacket the combustion chamber itself because of the high temperature level therein.

It is, therefore, an object of this invention to provide improved atmosphere gas generator apparatus. More specifically, it is an object to provide an atmosphere gas generator having improved means for cooling combustion products by means of directly contacting them with a cooling fluid in a packed bed. It is also an object of the invention to eliminate the need for water-jacketed members as required by prior art apparatus. It is a further object of the invention to provide an atmosphere gas generator having a combustion chamber and a cooling chamber which are integrally constructed.

For a further consideration of what is considered to be novel and inventive attention is directed to the following portion of the specification, the drawing, and the appended claims.

FIG. 1 is an elevational sectional view of an improved atmosphere gas generator constructed in accordance with the present invention;

FIG. 2 is a sectional view taken on line 2—2 of FIG. 1; and

FIG. 3 illustrates a modification of a portion of the apparatus of FIG. 2.

Referring more particularly to FIG. 1 there is illustrated a combustion chamber 11 formed by wall means 12 comprising a generally annular refractory wall 13 circumposed by metallic binding 14. Combustion chamber 11 is disposed in a generally vertical direction and is appropriately contoured for most efficient combustion therein by varying the thickness of refractory wall 13. An annular ledge 15 extending inwardly from metallic binding 14 is provided to support refractory wall 13.

A burner 16 is provided at the uppermost end of combustion chamber 11 and is effective therewith to promote the combustible reaction within chamber 11 of a combustible mixture of fuel and air which is delivered to burner 16 from a source, not shown, by means of inlet pipe 17. While burner 16 is, for illustrative purposes, of the pre-mix type it is also noted that the use of other types of burners such as nozzle mixing burners is contemplated.

Combustion chamber 11 is provided with an outlet comprising port 18, preferably disposed at the bottom thereof, to permit the escape of products of combustion.

Second wall means 21 comprising an annular metal plate 22 are disposed circumposing wall means 12. Wall means 21 extends beyond wall means 12 and forms an annular chamber 23 therewith. In addition, wall means 21, in conjunction with bottom plate 24, forms a sump chamber 25 disposed beneath combustion chamber 11 and annular chamber 23. Sump chamber 25 is adapted to contain a body of cooling fluid 26 which it receives from annular chamber 23 in a manner to be subsequently described. Liquid level control means are provided to maintain a predetermined minimum distance between the level of cooling fluid 26 and outlet port 18 so as not to require the combustion products exiting from combustion chamber 11 to bubble through any of the body of cooling fluid 26. Appropriate liquid level control means comprises a weir, such as the upper portion 27 of a vertically disposed open pipe 28, to permit the egress of cooling fluid from the sump chamber 25. Pipe 28 communicates with standpipe 29 which, in turn, has an exhaust connection 31 through which cooling fluid may be passed to a sewer or, alternatively, to a cooler for re-cooling and reuse.

The products of combustion which pass from combustion chamber 11 through outlet 18 are deflected upwardly into annular chamber 23 by cooling fluid 26. The products of combustion flow upwardly through annular chamber 23 to the upper portion thereof from whence they are exhausted by outlet pipe 32 by which they are passed to additional process components (not shown) for further processing (e.g. a $CO_2$ absorbing tower and/or a drier) or directly to the gas atmosphere consumer (e.g. a metallurgical treating furnace) without further processing.

Circulating means 33 are provided to circulate cooling fluid (e.g. water) through annular chamber 23 in direct contact with the products of combustion flowing upwardly therethrough. Circulating means 33 comprises an annular ported pipe 34 disposed in the upper portion of annular chamber 23 and an annular distributing trough 35 formed by a generally upwardly extending ported annular plate 36 whose inner periphery is coincident with the outer periphery of metallic binding 14. Annular pipe 34 receives cooling fluid from an external source (not shown) through inlet pipe 37. The cooling fluid is discharged from annular pipe 34 through ports 38 which preferably are inwardly directed so as to provide for splash cooling of the upper portion of metallic binding 14 thereby safeguarding against partial reheating of the cooled products of combustion by heat transfer through the upper portion of combustion chamber 11.

The cooling fluid which is discharged from annular pipe 34 through ports 38 collects in annular distributing trough 35 from whence it descends, by gravity, through circumferentially spaced ports 39. The use of a second distributing member 35, to receive cooling fluid from the first distributing member 34, and, in turn re-distribute the cooling fluid to packed bed 41 results in a more even distribution of cooling fluid in packed bed 41 than is obtainable with only a single distributing member.

Contact of the descending cooling fluid with the upwardly flowing products of combustion is facilitated by means of a packed bed 41, shown schematically. Packed bed 41 may be formed by means of small ring or saddle shaped refractory bodies supported on a horizontally disposed annular screen 42 whose outer periphery coincides with the inner periphery of annular metal plate 22 and whose inner periphery coincides with the outer periphery of metallic binding 14 of wall means 12. Annular screen 42 is supported by means of a plurality of thin, circumferentially disposed, gusset plates 43 attached to metallic binding 14.

In some instances it will be desirable to operate apparatus of the foregoing description either at a reduced rate of production or at relatively rich air: fuel ratios to produce a deoxidizing atmosphere gas with a substantial quantity of combustibles (CO and $H_2$). Both of these alternatives will result in a reduced rate of heat release within combustion chamber 11. During these periods it is desirable to conserve some of the heat which would otherwise be lost by radiation from combustion chamber 11 to the surface of the body of water 26. This may be accomplished by restricting the outlet 18 of combustion chamber 11. In the embodiment of FIGS. 1 and 2 the restriction is by means of a multi-ported plate 45 disposed horizontally across the end of combustion chamber 11 immediately subjacent outlet 18. Plate 45 is supported by a plurality of circumferentially disposed pins 44 attached to the bottom of metallic binding 14 and extending inwardly therefrom. It is to be noted that a rigid screen of a suitable mesh would be an equivalent of the illustrated multi-ported plate.

In the embodiment of FIG. 3 the outlet 18a of combustion chamber 11a is restricted by shaping refractory wall portion 13a of wall means 12a with a downwardly converging surface adjacent the bottom thereof. The construction of FIG. 3 is not, however, as desirable as the construction of FIGS. 1 and 2 wherein the combustion chamber is restricted by means of a multi-ported plate since it precludes construction of the combustion chamber by casting.

The use of a restricted combustion chamber outlet in accordance with FIGS. 1 and 2 or FIG. 3 has an additional advantage in that the pressure drop imparted thereby to the combustion products causes them to flow more evenly through all portions of packed bed 41.

The best mode known to us to carry out this invention has been described in terms sufficiently full, clear, concise, and exact as to enable any person skilled in the art to practice the invention. However, it is understood that various modifications will be readily apparent to a skilled artisan without departing from the scope of the invention which is defined only by the appended claims.

We claim:

1. A gas generator comprising in combination: first wall means forming a generally vertically disposed combustion chamber having an outlet at the bottom thereof; a multi-ported plate member disposed across the outlet of the combustion chamber to thereby restrict said outlet; burner means disposed adjacent the top of the combustion chamber and effective with said combustion chamber to promote the combustible reaction of fuel and air therein whereby combustion products will pass from the chamber through the outlet and said multi-ported plate member; second wall means circumposing the first wall means and forming a generally vertically disposed annular chamber therewith in communication with the outlet of the combustion chamber for receiving high temperature combustion products therefrom; means forming a sump disposed subjacent the outlet of the combustion chamber and in communication with the annular chamber, said sump containing cooling fluid, whereby products of combustion which have passed through said multi-ported plate member pass against the level of the cooling fluid in the sump and are thereby deflected upwardly into the annular chamber; circulating means for circulating cooling fluid in an annular pattern through the annular space in contact with the combustion products to the sump; contact means disposed in an annular pattern around the annular chamber for effecting intimate contact between the cooling fluid and the combustion products; drain means below the outlet of the combustion chamber for drawing cooling fluid from the sump; and level control means effective with the drain means for controlling the level of the cooling fluid in the sump to maintain a predetermined minimum distance between the level and the outlet of the combustion chamber so that the combustion products may pass from the combustion chamber into the annular chamber through said multi-ported plate member without passing through the cooling fluid in the sump.

2. A gas generator comprising in combination: first wall means forming a generally vertically disposed combustion chamber having an outlet at the bottom thereof; burner means disposed adjacent the top of the combustion chamber and effective with said combustion chamber to promote the combustible reaction of fuel and air therein whereby combustion products will pass from the chamber through the outlet; second wall means circumposing the first wall means and forming a generally vertically disposed annular chamber therewith in communication with the outlet of the combustion chamber for receiving high temperature combustion products therefrom; means forming a sump disposed subjacent the outlet of the combustion chamber and in communication with the annular chamber; circulating means comprising a first fluid distributing means disposed within the annular chamber adjacent the top thereof and adapted to discharge cooling fluid into said annular chamber at a plurality of circumferentially disposed points, and second fluid distributing means disposed subjacent the first fluid distributing means and adapted to receive cooling fluid discharged from the first fluid distributing means and to discharge cooling fluid into said chamber at a relatively circumferentially uniform rate; contact means disposed in an annular pattern around the annular chamber for effecting intimate contact between the cooling fluid and the combustion products; drain means below the outlet of the combustion chamber for drawing cooling fluid from the sump; and level control means effective with the drain means for controlling the level of the cooling fluid in the sump to maintain a predetermined minimum distance between the level and the outlet of the combustion chamber so that the combustion products may pass from the combustion chamber outlet against the level of cooling fluid in the sump and are thereby deflected upwardly into the annular chamber without passing through the cooling fluid in the sump.

3. A gas generator comprising, in combination: first wall means forming a generally vertically disposed combustion chamber having an inlet at the top thereof and an outlet at the bottom thereof; burner means disposed adjacent the top of the combustion chamber in fluid communication with the inlet thereof and effective with said combustion chamber to promote the combustible reaction of fuel and air therein whereby combustion products will pass from the chamber through the outlet; second wall means circumposing the first wall means and forming a generally vertically disposed annular chamber therewith in communication with the outlet of the combustion chamber for receiving high temperature combustion products therefrom; means forming a sump disposed subjacent the combustion chamber and in communication with the annular chamber; circulating means comprising fluid distributing means disposed within the annular chamber adjacent the top thereof adapted to receive cooling fluid and to distribute said fluid at a relatively circumferentially uniform rate generally downwardly through the annular space in direct counterflow heat transfer relationship with the products of combustion; contact means disposed in an annular pattern around the annular chamber for effecting intimate contact between the cooling fluid and the combustion products; drain means below the outlet of the combustion chamber for drawing cooling fluid from the sump; and level control means effective with the drain means for controlling the level of the cooling fluid in the sump to maintain a predetermined minimum distance between said level and the outlet of the combustion chamber so that the combustion products may pass from the combustion chamber outlet against the level of the cooling fluid in the sump and are thereby deflected upwardly into the annular chamber without passing through the cooling fluid into the sump.

References Cited by the Examiner
UNITED STATES PATENTS

| | | | |
|---|---|---|---|
| 2,594,330 | 4/52 | Mayhew | 23—281 X |
| 2,856,166 | 10/58 | Goettl | 261—97 X |
| 3,088,812 | 5/63 | Bitterlich et al. | 23—281 |

FOREIGN PATENTS

| | | |
|---|---|---|
| 879,914 | 10/61 | Great Britain. |

MORRIS O. WOLK, *Primary Examiner.*

JAMES H. TAYMAN, JR., Examiner.